Oct. 14, 1958 W. BROUWER 2,856,531
SPECTROSCOPIC APPARATUS
Filed June 1, 1956 2 Sheets-Sheet 1
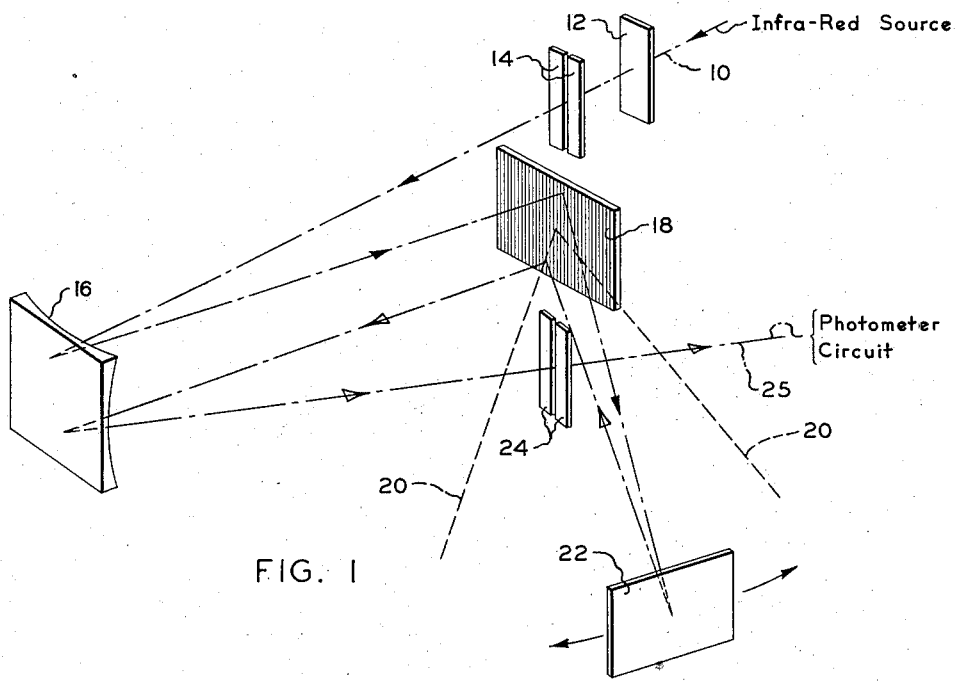
FIG. 1
| | | Blaze | | |
|---|---|---|---|---|
| 1st Order | 3.8μ | 7.5μ | 15μ | 30μ |
| | | Blaze | | |
| 2nd Order | 1.4μ | 3.8μ | 7.5μ | 15μ |
| | | Blaze | | |
| 3rd Order | 1.3μ | 2.5μ | 5.0μ | 10μ |
⟵ Mirror Position ⟶
FIG. 2
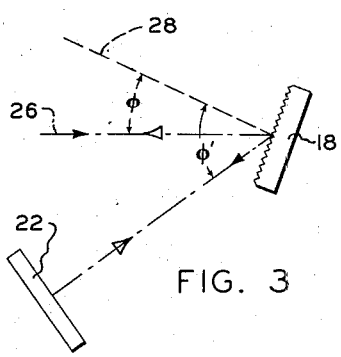
FIG. 3
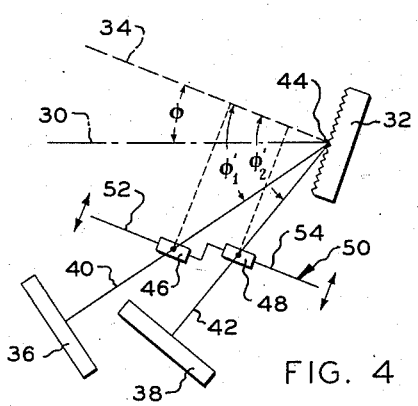
FIG. 4
INVENTOR
Willem Brouwer
BY
Gerald Altman
ATTORNEY United States Patent Office 2,856,531
Patented Oct. 14, 1958

2,856,531

SPECTROSCOPIC APPARATUS

Willem Brouwer, North Billerica, Mass., assignor to Baird Associates-Atomic Instrument Company, Cambridge, Mass., a corporation of Massachusetts Application June 1, 1956, Serial No. 588,644

15 Claims. (Cl. 250—43.5)

The present invention relates to spectroscopy and, more particularly, to a diffraction grating assembly that is applicable to a wide variety of spectroscopic instruments operable in a wide variety of wave length ranges, for example, to monochromators of the type providing in sequence, relatively pure wave lengths to be transmitted through a chemical sample for the purpose of indicating its chemical structure by a curve of percentage transmission vs. wave length.

In many spectroscopic instruments formation of a spectrum from the constituent wave lengths of incident radiation preferably is effected by a diffraction grating because of its relatively great dispersion, resolution and useful spectral range. However, a grating disperses incident radiation from an entrance slit into repeated sequences, called orders, of its constituent wave lengths. These orders overlap so that different wave lengths of different orders emanate from the diffraction grating in any given direction. Portions of overlapping orders in practice are readily isolated for transmission through an exit slit by filters or the like in a manner which need not be discussed at this point in detail. Because the grating distributes the available energy of incident radiation into several orders, each order tends to be of undesirably weak intensity. It is the practice to obviate this weakness by shaping the grating grooves so that the intensities of beams diffracted in a given general direction called the blaze, are maximized. In other words, beams of particular wave lengths in different orders are of high intensity in the blaze, and beams out of the blaze are of low intensity.

Particular wave lengths may be readily selected in sequence from any given order in the blaze for transmission through the exit slit, for example, simply either by rotating the grating about its axis or by moving a mirror arcuately about the grating axis so as to sequentially reflect diffracted beams back to the grating and thence through the exit slit. It is apparent in both of these cases that wave lengths sequentially selected in any given order will eventually run out of the blaze. When this occurs it is possible but troublesome to shift back to a new order in the blaze for the purpose of continuing the sequential selection of wave lengths of high intensity.

The primary object of the present invention is to provide, for incorporation in any of a wide variety of spectroscopic instruments operable in any of a wide variety of wave length ranges, a spectroscopic assembly comprising (1) a diffraction grating of specified blaze for dispersing incident radiation from an entrance slit into orders of constituent wave lengths, and (2) a plurality of mirrors, at least one of which is always in the blaze, so constrained for motion about the grating as to select at one time different orders of one wave length of a range for transmission through an exit slit. The mirrors, which remain respectively assigned to their associated orders, serve to maintain high intensity as they select the wave lengths of a sequence by in effect shifting from order to order in the blaze and by adding the energies of different orders.

Other objects of the present invention will in part be obvious and will in part appear hereinafter.

The invention accordingly comprises the apparatus possessing the features, properties and relation of components that are exemplified in the following detailed disclosure, the scope of which will be indicated in the appended claims.

For a fuller understanding of the nature and objects of the present invention, reference should be had to the following detailed description taken in connection with the accompanying drawings wherein:

Figure 1 is a perspective view of some of the components of an assembly embodying the present invention;

Fig. 2 illustrates portions of three orders of a spectrum selected by the mirror of Fig. 1 in various positions, the three orders being shown in separate rows for clarity rather than overlapping in a single row or field as in practice;

Fig. 3 is a plan schematic view illustrating mathematical relationships among the components of Fig. 1;

Fig. 4 is a plan schematic view, analogous to Fig. 3, illustrating the mathematical basis of the present invention.

Figure 5:
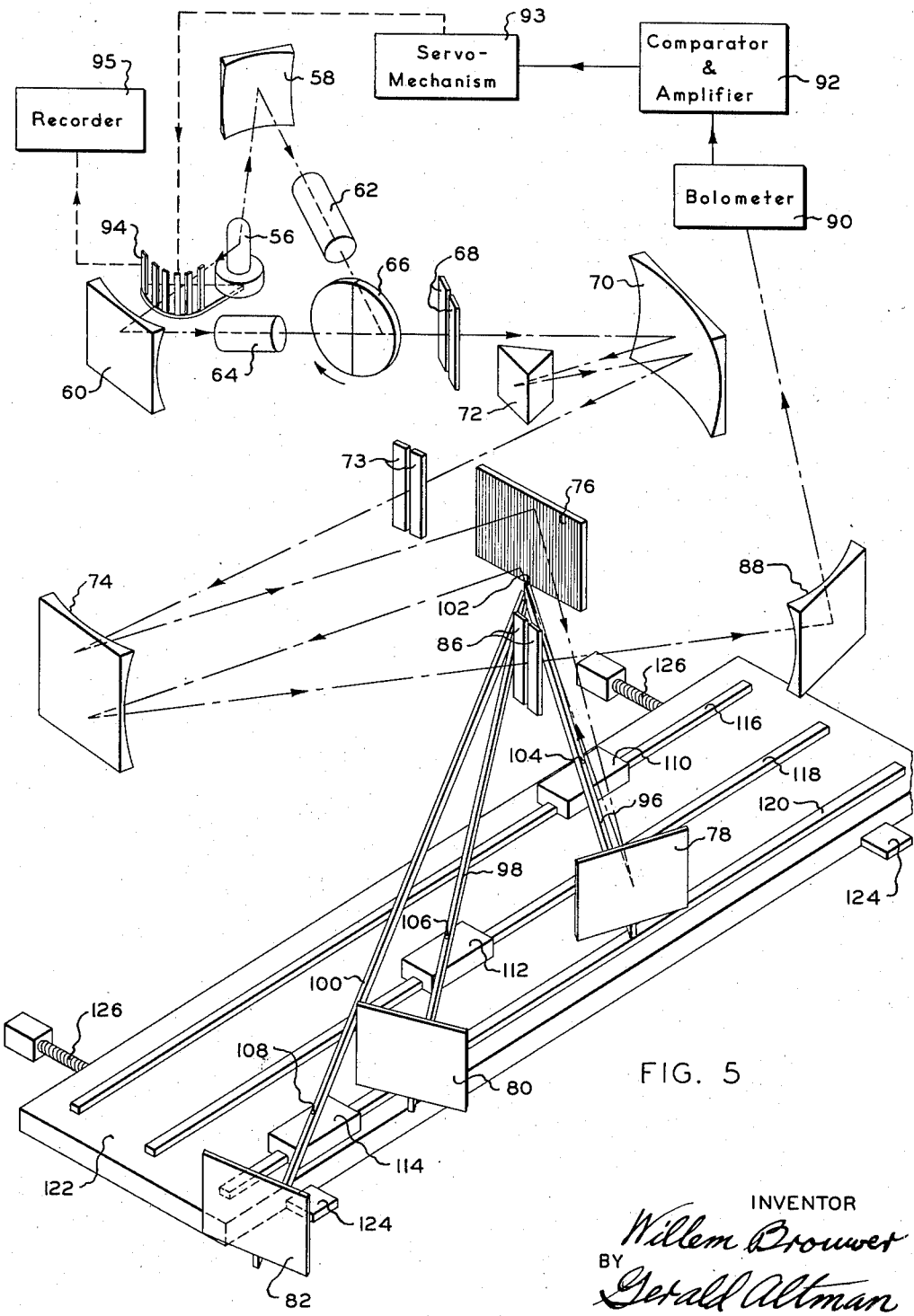
Fig. 5 is a diagrammatic view, partly in perspective and partly in block, of a preferred embodiment of the present invention.

The principles illustrated in Figs. 1, 2 and 3 are intended to facilitate a comprehension of the present invention as illustrated in Figs. 4 and 5. All of the figures for exemplary purposes refer specifically to the production in sequence of relatively pure wave lengths in the infra-red region of the electro magnetic spectrum and, more particularly, in the wave length range of approximately $0.75\mu$ (7500 A.) to approximately $30\mu$ (30,000 A.).

Fig. 1 illustrates a spectroscopic assembly of components which include an original source 10 of infra-red radiation, a replaceable filter 12 for restricting the radiation to a narrow wave-length range, an entrance slit 14 which serves as a line source, a concave mirror 16 (e. g. spherical or parabolic) for collimating rays from the entrance slit, a plane diffraction grating 18 for diffracting rays from the concave mirror in a given blaze indicated within dotted lines 20, 20, a plane mirror 22 that is parallel to and movable arcuately about an axis coinciding with the grating surface and parallel to the grating grooves, hereinafter called merely the axis in the grating, for returning diffracted rays of a sequence to the grating and the concave mirror, an exit slit 24 upon which the diffracted rays are focused by the concave mirror, and photometer circuit or the like 25 for reading the intensity of the beam from the exit slit.

In the absence of filter 12, grating 18 would disperse the collimated rays from concave mirror 16 into overlapping orders in the manner illustrated graphically in Fig. 2. For example, the lines at $15\mu$ in the first order, $7.5\mu$ in the second order and $5.0\mu$ in the third order would coincide. Filter 12, however, is one of a series, each of which confines the radiation diffracted by grating 18 to a narrow wave length range for the purpose of isolating selected lines. For example, filter 12 could be so composed as to pass only wave lengths within the range of 12 to $18\mu$. Here it is apparent that the line at $15\mu$ in the first order would be unconfused with the lines at $7.5\mu$ in the second order and $5.0\mu$ in the third order, which are not present. In practice either a series of filters, passing selected wave length ranges to the entrance slit, or a fore-prism system, directing only selected wave length ranges of its spectrum toward the entrance slit, make it possible to isolate any selected wave length range without difficulty. The discussion immediately following will assume that proper filtration is being effected to isolate various wave length ranges in various orders, without further reference to the mechanism of that filtration.

In the assembly of Fig. 1 entrance slit 14, concave mirror 16, grating 18 and exit slit 24 are fixed, and wave lengths of a given sequence are transmitted through the exit slit by virtue of the movement of mirror 22 in an arc about the axis of grating 18. This movement is such that the plane of mirror 22 is always perpendicular to the radius of the arc. As the movement of mirror 22 is continued, it will eventually run out of the blaze direction. For example, in reference to Fig. 2, mirror 22 remains within the blaze while successively reflecting selected wave lengths from $15\mu$ down to $7.5\mu$ in the first order but leaves the blaze while successively reflecting selected wave lengths from $7.5\mu$ to $3.8\mu$ in the first order. It is possible to move the mirror back to its original position for the purpose of entering a new order in the blaze direction from which the next wave lengths of the sequence may be selected. For example, the mirror could be moved back to $7.5\mu$ in the second order which together with wave lengths down to $3.8\mu$ are in the blaze. However, where wave lengths are being transmitted through a chemical sample in order to determine their percentage transmission, such resetting of the mirror would result in a discontinuity in the curve of transmission vs. wave length.

The present invention contemplates a plurality of mirrors which are moved in unison in respective orders by means of the simple and precise mechanism illustrated in Fig. 5. This mechanism assigns one mirror to one order so that as one mirror runs out of the blaze another mirror runs into it. In effect, this mechanism shifts from order to order within the blaze smoothly and continuously without the disruption of returning any mirror to its original position. The various mirrors present the further advantage of adding the energies of various orders into a resulting beam of high intensity. An understanding of the mechanism of Fig. 5 will be facilitated by a consideration of Figs. 3 and 4.

Fig. 3 illustrates the geometrical relationships that arise when a beam 26, as shown by the black arrowheads, is directed from an entrance slit toward grating 18 at an angle $\phi$ to the grating normal 28 and diffracted toward mirror 22 at an angle $\phi^1$ to the grating normal. As shown by the white arrowheads, the beam is returned back along its original path toward an exit slit. It is well known that:

$$m\lambda = p\ (\sin \phi + \sin \phi^1)$$

where $m$ = number of spectrum order
$\lambda$ = wavelength under consideration
$\phi$ = angle of incidence
$\phi^1$ = angle of diffraction and $p$ = grating constant From the foregoing equation can be derived relations useful in the design of a mechanism for constraining two mirrors into positions at which they reflect the same wavelength in two orders. Fig. 4 illustrates the geometrical relationships that arise when a beam 30 is directed from an entrance slit toward a grating 32 at an angle $\phi$ to the grating normal 34 and is diffracted in two components toward mirrors 36 and 38 at angles $\phi_1^1$, and $\phi_2^1$, respectively, to the grating normal. As shown the two components of beam 30 are returned back along their original paths toward grating 32 where they are united for transmission through an exit slit. From the foregoing equation $$m_1 \lambda = p\ (\sin \phi + \sin \phi_1^1)$$

and $$m_2 \lambda = p\ (\sin \phi + \sin \phi_2^1)$$

where $m_1$ = a spectrum order number
$m_2$ = another spectrum order number
$\phi$ = angle of incidence
$\phi_1^1$ = angle of diffraction of order $m_1$
$\phi_2^1$ = angle of diffraction of order $m_2$
$p$ = grating constant.

It follows that for any selected wave length, $\lambda$ $$\frac{m_1}{m_2} = \frac{\sin \phi + \sin \phi_1^1}{\sin \phi + \sin \phi_2^1}$$

or $$\sin \phi_1^1 = \frac{m_1}{m_2} \sin \phi_2^1 + \left(\frac{m_1}{m_2} - 1\right) \sin \phi$$

In accordance with the present invention, mirrors 36 and 38 are affixed to the outer ends of arms 40 and 42, respectively, which are pivoted at the axis 44 in grating 32. The last mentioned equation indicates that if mirrors 36 and 38 are always to reflect different orders of any selected wave length, the distance from any fixed point 46 on arm 40 to normal 34 is a constant increment greater than the distance from a related fixed point 48 on arm 42 to normal 34.

Specifically:
The distance from point 46 to normal 34 = $\sin \phi_1^1 \times$ the distance between point 46 and axis 44.

The incremental difference between the distances from points 46 and 48 to normal $34 = \left(\dfrac{m_1}{m_2} - 1\right) \sin \phi \times$ the distance between point 46 and axis 44.

The distance between point 48 and axis $44 = \dfrac{m_1}{m_2} \times$ the distance between point 46 and axis 44.

In accordance with the present invention, the foregoing relations between arms 40 and 42 may be maintained by a bar 50 having parallel sections 52 and 54 of the following construction. Sections 52 and 54, which are parallel to normal 34, are slidably and pivotably connected, respectively, at fixed points 46 and 48 on arms 40 and 42. The distance between the arms is equal to the incremental distance discussed above. When bar 50 is moved parallel to itself (and to normal 34), it constrains arms 40 and 42 into successive positions at which they always lie along paths of different orders of a given wave length. The movement of the bar is directly proportional to the wave length change.

It is apparent that the number of mirrors can be expanded to as many as seems feasible. By proper design, the arrangement is such that as one mirror runs out of the blaze another mirror runs into the blaze.

The arrangement can be simplified by choosing $\phi=0$ so that $$\sin \phi_2^1 = \frac{m_1}{m_2} \sin \phi_1^1$$

Here the bar connecting the mirror arms would be straight because $$\left(\frac{m_1}{m_2} - 1\right) \sin \phi = 0$$

Fig. 5 is a diagrammatic view, partly in perspective, of the rudiments of an illustrative automatic-recording, infra-red absorption spectrophotometer. Radiation from an infra-red source 56 is reflected by two identical spherical mirrors 58 and 60 through two identical hollow cells 62 and 64, respectively. Cell 62 carries the sample and cell 64 may carry a reference standard with respect to which the transmission of the sample is to be measured. Since, by definition the transmission of the reference cell is 100 percent, in determining the ratio of the transmission of the sample to that of the reference, the instrument measures the percentage transmission by the sample of a given wave length. The beams emanate from cells 62 and 64 at right angles to each other toward a point of intersection at which a mechanical alternator 66 is located. Alternator 66 is in the form of a motor driven, rotating disk, one sector of which is a plane mirror and the other section of which is a transparent window. When the reflecting sector is at the beam inter-section, the beam from the sample cell is directed through a slit 68 and the beam from the sample cell is occulted. When the transparent sector is at the beam inter-section the beam from the reference cell is directed through slit 68 toward a concave mirror 70 by which they are reflected to a rotatable foreprism 72 for selection of a desired wave-length range. A mirrored face of the foreprism reflects the beams back to mirror 70 which directs them to the entrance slit 73 of a monochromator now to be described.

This monochromator comprises a concave mirror 74 for collimating radiation received from entrance slit 73, a plane diffraction grating 76 for dispersing radiation from collimating mirror 74 into spectrum orders, a plurality of mirrors 78, 80 and 82 for reflecting different orders of a single wave length back to the diffraction grating for transmission back to mirror 74 and through an exit slit 86. Two components representing the two beams transmitted through cells 62 and 64 are alternately transmitted from exit slit 86 to a concave mirror 88 focused on a bolometer 90. The resulting electrical intensities are compared in a suitable circuit 92 and an electrical signal representing the unbalance is applied to a servo mechanism 93 which controls the degree to which a comb 94 is interposed between source 56 and 60 in a manner which tends to eliminate the unbalance. The position of the comb is recorded by pen and drum 95 as a representation of percentage transmittance vs. wave length.

Mirrors 78, 80 and 82 are parallel to and movable arcuately about the axis in grating 76 by the following mechanism. Mirrors 78, 80 and 82 are supported at the outer ends of arms 96, 98 and 100, respectively, each of which is pivoted on a journal 102 aligned with the axis in grating 76. Arms 96, 98 and 100 are pivoted at fixed points 104, 106 and 108, respectively, to slides 110, 112 and 114, respectively. Slides 110, 112 and 114 are constrained by spaced parallel tongues 116, 118 and 120, respectively, of a bed 122, the ends of which are slidably mounted for parallel movement by a pair of guides 124, 124. By means of synchronized screws 126, 126 bed 122 is movable toward and away from the collimated beam (from mirror 74) to which sections 116, 118 and 120 are always parallel. If the collimated beam (from mirror 74) is normal to grating 76, sections 116, 118 and 120 are aligned in the form of a straight bar. The dimensions of the various components of this mechanism are determined in the manner discussed above in reference to Fig. 4.

The illustrated form of the present invention thus comprises a novel monochromator including a plurality of mirrors constrained for motion in assigned orders for the purpose of smoothly intercepting at any given time most of the available energy of one of a sequence of wave lengths.

Since certain changes may be made in the above-described device without departing from the scope of the invention herein involved, it is intended that all matter contained in the above description and shown in the accompanying drawing be interpreted in an illustrative and not in a limiting sense.

What is claimed is:

1. A spectroscopic assembly comprising a source of radiation, means for transmitting a limited range of wave lengths from said source, an entrance slit for transmitting said limited range of wave lengths from said means, a diffraction grating for receiving said limited range of wavelengths from said entrance slit, a plurality of mirrors for selecting at one time different orders of one wave length of said range from said grating, and an exit slit for transmitting said different orders of said one wave length.

2. A spectroscopic assembly comprising a diffraction grating for dispersing incident radiation from an entrance slit into orders of constituent wave lengths, and a plurality of mirrors parallel to the grating axis and constrained for motion in arcs about said grating axis, said mirrors selecting at one time different orders of one wave length of a sequence for the purpose of reflecting said different orders of said one wave length back to said grating and through an exit slit.

3. A spectroscopic assembly comprising a diffraction grating for dispersing incident radiation from an entrance slit into orders of constituent wave lengths, and a plurality of mirrors constrained for arcuate motion about said grating, said mirrors selecting at one time different orders of one wave length of a sequence for transmission through an exit slit, each pair of said mirrors and said grating being related by the equation:

$$\sin \phi_1^1 = \frac{m_1}{m_2} \sin \phi_2^1 + \left(\frac{m_1}{m_2} - 1\right) \sin \phi$$

where $m_1$ = a spectrum order number;
$m_2$ = another spectrum order number;
$\phi$ = angle of incidence of radiation on diffraction grating;
$\phi_1^1$ = angle of diffraction of order $m_1$;
$\phi_2^1$ = angle of diffraction of order $m_2$;
$p$ = grating constant.

4. A spectroscopic assembly comprising a plane diffraction grating for dispersing incident radiation from an entrance slit into orders of constituent wave lengths, and a plurality of plane mirrors parallel to the grating axis, said mirrors being carried at the outer ends of a plurality of arms, the inner ends of said arms being journaled about an axis in said grating, said mirrors selecting at one time different orders of one wave length of a sequence for transmission through an exit slit.

5. A spectroscopic assembly comprising a plane diffraction grating for dispersing a beam of incident radiation from an entrance slit into orders of constituent wave lengths, a plurality of plane mirrors parallel to an axis in said grating, a plurality of arms having inner ends journaled about said axis and having outer ends carrying said mirrors, said mirrors selecting at one time different orders of one wave length of a sequence for transmission through an exit slit, a succession rigidly joined guides, one each of said guides being slidable and pivotable with respect to one each of said arms at a point fixed on said one each of said arms, said sections each being parallel to said beam, said sections being constrained for movement in parallelism toward and away from said beam.

6. A spectroscopic assembly comprising a plane diffraction grating for dispersing a beam of incident radiation from an entrance slit into orders of constituent wave lengths, a plurality of plane mirrors parallel to an axis in the grating, a plurality arms having inner ends journaled about said axis and having outer ends carrying said mirrors, said mirrors selecting at one time different orders of one wave length of a sequence for transmission through an exit slit, a plurality of elongated elements, one each of said elements being slidable and pivotable with respect to one each of said arms at a point fixed on said one each of said arms, said elongated elements being parallel to said beam, said elements being constrained for movement in parallelism toward and away from said beam, and means for isolating one order of said one wave length from overlapping orders of said one wave length.

7. A spectroscopic assembly comprising a plane diffraction grating for dispersing a beam of incident radiation from an entrance slit into orders of constituent wave lengths, a plurality of plane mirrors parallel to an axis in the grating, a plurality arms having inner ends journaled about said axis and having outer ends carrying said mirrors, said mirrors selecting at one time different orders of one wave length of a sequence for the purpose of reflecting said different orders of said one wave length back to said grating and through an exit slit, a succession of rigidly joined elongated elements, one each of said elements being slidable and pivotable with respect to one each of said arms at a point fixed on said one each of said arms, said elements being parallel to said beam, said elements being constrained for movement in parallelism toward and away from said beam, and filter means at said entrance slit for restricting said beam to a narrow range of constituent wave lengths.

8. A spectroscopic assembly comprising a plane diffraction grating for dispersing a beam of incident radiation from an entrance slit into orders of constituent wave lengths, a plurality of plane mirrors, a plurality arms having inner ends journaled at said grating and having outer ends carrying said mirrors, said mirrors selecting at one time different wave-length orders for transmission through an exit slit, a plurality of elements slidable and pivotable at points fixed on said arms, said elements being parallel to said beam, said elements being constrained for movement in parallelism toward and away from said beam, and a fore-prism at said entrance slit for restricting said beam to a narrow range of constituent wave lengths.

9. A spectroscopic assembly comprising a plane diffraction grating for dispersing a beam of incident radiation from an entrance slit into orders of constituent wave lengths, a plurality of plane mirrors parallel to an axis in said grating, a plurality arms having inner ends journaled about said axis and having outer ends associated with said mirrors, said mirrors selecting at one time different orders of a wave length of a sequence for the purpose of reflecting said different orders of said wave length back to said grating and through an exit slit, a plurality of elongated elements slidable and pivotable at points fixed on said arms, said elements being parallel to said beam, said sections being constrained for movement in parallelism toward and away from said beam, means for converting radiation transmitted through said exit slit into an electrical signal, and means for converting said electrical signal into mechanical output.

10. A spectroscopic assembly comprising a plane diffraction grating for dispersing a beam of incident radiation from an entrance slit into orders of constituent wave lengths, a plurality of plane mirrors parallel to an axis in said grating axis, a plurality arms having inner ends journaled about said axis and having outer ends carrying said mirrors, said mirrors selecting at one time different orders of one wave length of a sequence for the purpose of reflecting said different orders of said one wave length back to said grating and through an exit slit, a bed having successive elongated ribs, one each of said ribs being slidable and pivotable with respect to one each of said arms at a point fixed on said one each of said arms, said ribs being parallel to said beam, said ribs being constrained for movement in parallelism toward and away from said beam, said beam of incident radiation having two components intermittently transmitted during discrete intervals, the first component having been transmitted through a sample cell and the second component having been transmitted through a reference cell, whereby the intensity of said first component may be compared with the intensity of said second component for the purpose of obtaining a curve of percentage transmission through said sample vs. wave length.

11. A spectroscopic assembly comprising a plane diffraction grating for dispersing a beam of incident radiation from an entrance slit into orders of constituent wave lengths, a plurality of plane mirrors, parallel to an axis in said grating, a plurality arms having inner ends journaled about said axis and having outer ends carrying said mirrors, said mirrors selecting at one time different orders of one wave length of a sequence for the purpose of reflecting said different orders of said one wavelength back to said grating and through an exit slit, a bed having a succession of parallel ribs, one each of said ribs being slidably and pivotably connected to one each of said arms at a point fixed on said one each of said arms, said ribs being parallel to said beam, said ribs being constrained for movement in parallelism toward and away from said beam, said beam of incident radiation having two components intermittently transmitted during discrete intervals, the first component having been transmitted through a sample cell and the second component having been transmitted through a reference cell, means for converting said two components of radiation after transmission through said exit slit into electrical signals, means for comparing the intensities of said electrical signals, and means for converting the differences between said intensities into mechanical output, whereby the intensity of said first component may be compared with the intensity of said second component for the purpose of obtaining a curve of percentage transmission through said sample vs. wave length.

12. A spectroscopic assembly comprising: a plane diffraction grating for dispersing a beam of incident radiation from an entrance slit into orders of constituent wave lengths, the angle between said beam and the normal to said diffraction grating being predetermined; a plurality of arms having inner ends journaled about an axis in said grating; a plurality of mirrors carried by the outer ends of said arms, said mirrors being parallel to said axis and reflecting at one time different orders of one wave length of a sequence for transmission through an exit slit; a succession of elongated elements, one each of said elements being slidably and pivotably connected to one each of said arms at a fixed point thereon, said elements being parallel to said beam, said elements being constrained for movement in parallelism toward and away from said beam; the relationships among each pair of said arms, the numbers, $m_1$ and $m_2$, of the orders intercepted by the pair of mirrors carried by said pair of arms, and said axis being as follows: the distance from the fixed point on one arm of said pair to said normal equaling the sine of the angle between said one arm and said normal multiplied by the distance between the fixed point on said one arm and said axis; the distance between the fixed point on the other arm of said pair and said axis equalling $m_1/m_2$ multiplied by the distance between the fixed point on said other arm and said axis; and the incremental difference between the distances from the fixed points on said pair of arms to said normal equalling $(m_1/m_2-1)$ multiplied by the sine of the angle between said beam and said normal multiplied by the distance between said fixed point on said one arm and said axis.

13. The spectroscopic assembly of claim 12 wherein said angle between said beam and said normal equals zero, whereby said elements are aligned.

14. The spectroscopic assembly of claim 12 wherein said angle between said beam and said normal is greater than zero, whereby said elements are unaligned.

15. A spectroscopic assembly comprising a source of radiation, an entrance slit, a plane diffraction grating for dispersing a beam of said radiation from said entrance slit into orders of constituent wave lengths, a plurality of plane mirrors parallel to an axis in said grating, a plurality of arms having inner ends journaled about said axis and having outer ends carrying said mirrors, an exit slit, said mirrors selecting at one time different orders of one wave length of a sequence for the purpose of reflecting said different orders of said one wave length back to said grating and through said exit slit, a bed having a succession of parallel guides, one each of said guides being slidably and pivotably connected to one each of said arms at a point fixed on said one each of said arms, said guides being parallel to said beam, said guides being constrained for movement in parallelism toward and away from said beam, said beam having two components intermittently transmitted during discrete intervals, mirror means for transmitting the first component through a sample cell, mirror means for transmitting the second component through a reference cell, bolometer means for converting said two components after transmission through said exit slit into electrical signals, electronic means for comparing the intensities of said electrical signals, servo means for converting the differences between said intensities into mechanical output, and recording means for representing said mechanical output as a curve of percentage transmission through said sample vs. wave length.

References Cited in the file of this patent

UNITED STATES PATENTS

| | | |
|---|---|---|
| 2,420,077 | Hasler et al. | May 6, 1947 |
| 2,453,164 | Swings | Nov. 9, 1948 |

OTHER REFERENCES

Multiple Diffraction in Grating Spectroscopy, by Fastie and Sinton from Journal of the Optical Society of America, vol. 14, No. 2, February 1954, pp. 103–108.